(12) United States Patent
Dewey

(10) Patent No.: US 8,806,464 B2
(45) Date of Patent: Aug. 12, 2014

(54) PROCESS FLOW OPTIMIZED DIRECTED GRAPH TRAVERSAL

(75) Inventor: David Bryan Dewey, Milton, GA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/456,385

(22) Filed: Apr. 26, 2012

(65) Prior Publication Data

US 2013/0291113 A1 Oct. 31, 2013

(51) Int. Cl.
*G06F 9/45* (2006.01)
*G06F 9/44* (2006.01)

(52) U.S. Cl.
USPC ............ 717/155; 717/124; 717/132; 717/156

(58) Field of Classification Search
CPC ........... G06F 8/20; G06F 8/433; G06F 8/443; G06F 11/3688
USPC .......................................................... 726/25
See application file for complete search history.

(56) References Cited

U.S. PATENT DOCUMENTS

| | | | |
|---|---|---|---|
| 5,666,296 A | 9/1997 | Gafter | |
| 7,426,721 B1 | 9/2008 | Saulpaugh et al. | |
| 8,046,751 B1 * | 10/2011 | Avadhanula et al. | 717/156 |
| 8,161,459 B2 * | 4/2012 | Gorthi et al. | 717/124 |
| 8,234,637 B2 * | 7/2012 | Ghosh-Roy et al. | 717/155 |
| 8,359,583 B2 * | 1/2013 | Chou et al. | 717/132 |
| 8,516,467 B2 * | 8/2013 | Guy et al. | 717/155 |
| 2007/0174241 A1 * | 7/2007 | Beyer et al. | 707/3 |
| 2009/0007087 A1 | 1/2009 | Ito et al. | |
| 2009/0106182 A1 | 4/2009 | Yamaoka | |
| 2010/0079458 A1 * | 4/2010 | Koehler et al. | 345/440 |
| 2010/0083240 A1 * | 4/2010 | Siman | 717/144 |
| 2011/0191760 A1 * | 8/2011 | Guy et al. | 717/155 |
| 2011/0225571 A1 * | 9/2011 | Stanford-Jason | 717/145 |

FOREIGN PATENT DOCUMENTS

| | | |
|---|---|---|
| JP | 2003216440 A | 7/2003 |
| KR | 20010075871 A | 8/2001 |

OTHER PUBLICATIONS

Gooneratne et al., Verification of web service descriptions using graph-based traversal algorithms, Mar. 2007, 8 pages.*
Satish et al., Large-scale energy-efficient graph traversal: a path to efficient data-intensive supercomputing, Nov. 2011, 11 pages.*
T. Ball What's in a Region? or Computing Control Dependences in Near-Linear Time for Reducible Control Flow, Dec. 1993, 16 pages, vol. 2, Issue 1, University of Wisconsin, Madison.

* cited by examiner

*Primary Examiner* — Thuy Dao
(74) *Attorney, Agent, or Firm* — Sarah E. Burrows

(57) ABSTRACT

Embodiments disclosed herein relate to a process flow optimized directed graph traversal. In one embodiment, a processor performs a depth first traversal of the optimized directed graph where a node from a first node is not traversed until the nodes before the first node are traversed. The processor may output information associated with the nodes based on the traversal.

15 Claims, 5 Drawing Sheets

PROCESS FLOW OPTIMIZED DIRECTED GRAPH TRAVERSAL

BACKGROUND

A directed graph may include multiple interconnected nodes where the nodes represent steps in a process. The nodes may be connected to each other in particular directions to indicate an order of the steps associated with the nodes. An optimized directed graph may include a more efficient version of the directed graph where multiple nodes converge to the same node. An optimized directed graph may be used to represent the flow of different types of processes, such as steps in software source code or hardware logic.

BRIEF DESCRIPTION OF THE DRAWINGS

The drawings describe example embodiments. The following detailed description references the drawings, wherein.

DETAILED DESCRIPTION

A process flow may be represented by a directed graph with nodes associated with steps in the process and branches between the nodes representing a flow of the steps in the process. A directed graph may include nodes representing steps in a process where the nodes branch to other nodes based on conditions, such as where a node branches to first node for a true condition and to a second node for a false condition. In an optimized directed graph, multiple predecessor nodes may branch to the same node to optimize the directed graph in a manner that eliminates a repeated node from the directed graph. For example, the true condition for node A and the false condition for node B may both result in node C.

In one implementation, an optimized directed graph is traversed to output the flow of the steps associated with the nodes in the optimized directed graph. The traversal may be performed in a manner that addresses the case where multiple nodes converge into a single node. For example, a depth first traversal of an optimized directed graph may be performed such that each predecessor sub-graph resulting in a first node is traversed prior to performing a depth first traversal of the nodes in the sub-graph rooted at the first node. For example, for an optimized directed graph may have a root node A branching to node B and node C where both node B and node C converge to node D which proceeds to node E. Nodes A, B, and C may be traversed prior to traversing node D to node E because nodes B and C are predecessors of the sub-graph rooted at node D. Information associated with the nodes may be output to indicate a textual version of the process flow represented in the optimized directed graph. As an example, an optimized directed graph may be created to represent a process performed by an electronic device, such as a process flow of a software program or hardware logic.

Figure 1:
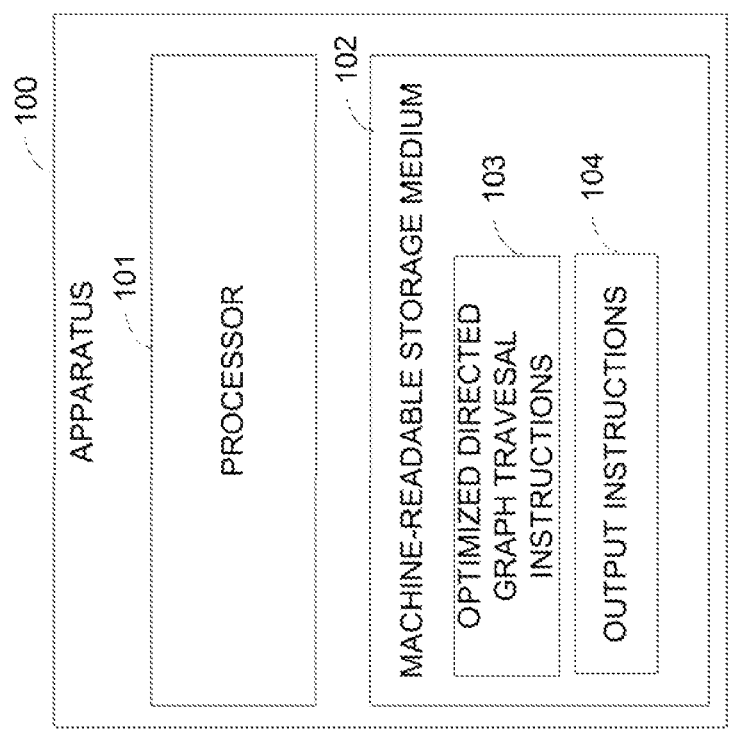
FIG. 1 is a block diagram illustrating one example of an apparatus to traverse an optimized directed graph of a process flow.

FIG. 1 is a block diagram illustrating one example of an apparatus 100 to traverse an optimized directed graph of a process flow. The apparatus 100 may receive an optimized directed graph and traverse the directed graph in a manner that outputs text associated with the nodes to reflect the relationships between steps in the process. The apparatus 100 may receive the optimized directed graph in any suitable manner, such as from a storage within the apparatus 100 or from another electronic device via a network. In one implementation, the apparatus 100 creates the optimized directed graph, such as by executing a software program. The optimized directed graph may be an optimized directed graph related to computing technology, such as a software or hardware process optimized directed graph. For example, each node may represent a section of software source code. Nodes may diverge to represent conditional statements in the software source code, such as where a first node represents the code executed if a statement is true and a second node represents the code executed if the statement is false. In an optimized directed graph, multiple nodes may result in the same node to represent where the same software source code is executed after proceeding along different pathways. Text output may be provided to reflect a reverse engineering of the optimized directed graph.

The apparatus 100 may include a processor 101 and a machine-readable storage medium 102. The processor 101 may be any suitable processor, such as a central processing unit (CPU), a semiconductor-based microprocessor, or any other device suitable for retrieval and execution of instructions. In one embodiment, the apparatus 100 includes logic instead of or in addition to the processor 101. As an alternative or in addition to fetching, decoding, and executing instructions, the processor 101 may include one or more integrated circuits (ICs) or other electronic circuits that comprise a plurality of electronic components for performing the functionality described below. In one implementation, the apparatus 100 includes multiple processors. For example, one processor may perform some functionality and another processor may perform other functionality.

The machine-readable storage medium 102 may be any suitable machine readable medium, such as an electronic, magnetic, or other physical storage device that stores executable instructions or other data (e.g., a hard disk drive, random access memory, flash memory, etc.). The machine-readable storage medium 102 may be, for example, a computer readable non-transitory medium.

The machine-readable storage medium 102 may include optimized directed graph traversal instructions 103 and output instructions 104. The optimized directed graph traversal instructions 103 may include instructions to traverse an optimized directed graph to determine the flow of the steps within the optimized directed graph. The optimized directed graph traversal instructions 103 may include instructions to perform a depth first traversal of nodes in each predecessor sub-graph in an optimized conditional directed graph resulting in a first node prior to performing a depth first search of the nodes in the sub-graph rooted at the first node. For example, an optimized directed graph may have a first sub-graph of nodes that converges at a first node and a second sub-graph of nodes rooted at the first node. Each of the nodes in the first sub-graph may be traversed prior to traversing the nodes of the second sub-graph. The nodes may be traversed in the order such that each relationship with a node is determined.

The output instructions 104 may include instructions to output text associated with nodes in the optimized directed graph in a manner that reflects the relationships between nodes in the optimized directed graph discovered during the traversal. The output instructions 104 may include instructions to store, display, or transmit the text. In one implementation, the output instructions 104 include instructions to output the text to another application for analyzing the text. The output text may be used to represent a higher level of a software source code, hardware, or a process design. For example, the output text may be a human readable version of the process flow.

Figure 2:
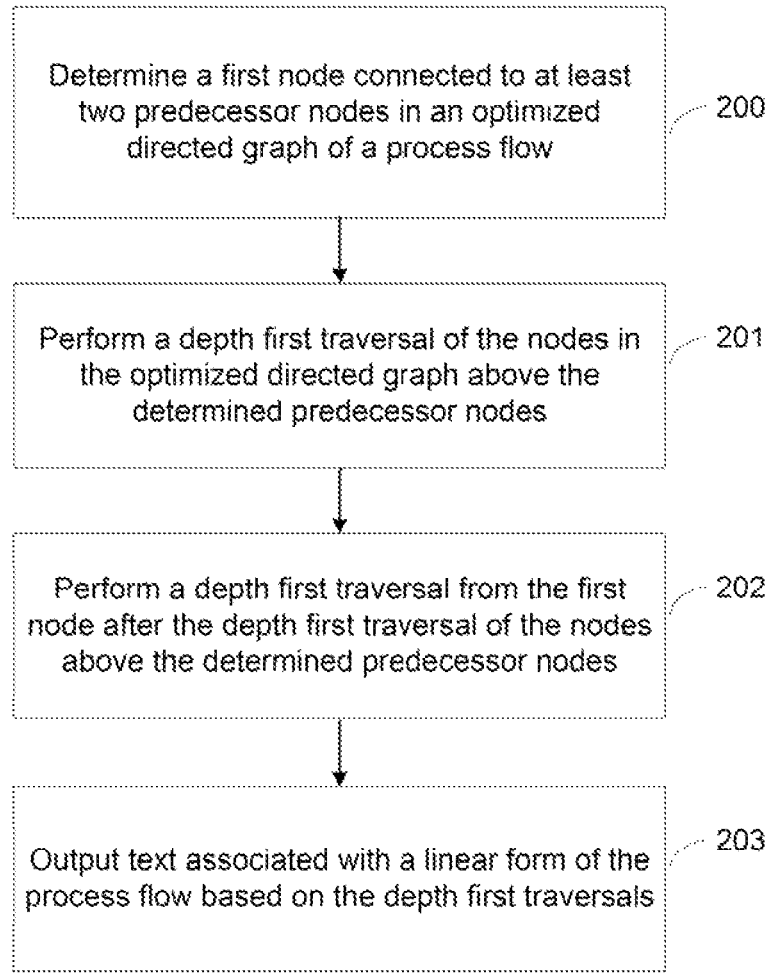
FIG. 2 is a flow chart illustrating one example of a method to traverse an optimized directed graph to output information about a process flow described by the optimized directed graph.

FIG. 2 is a flow chart illustrating one example of a method to traverse an optimized directed graph to output information about a process flow described by the optimized directed graph. An optimized directed graph may include multiple nodes converging to a single node, such as where multiple process steps are proceeded by the same step. The optimized directed graph nodes may branch based on conditions in the process, such as where a first node branches to a second node if a condition is true and to a third node if a condition is false. The optimized graph may be traversed in a manner that allows relationships between multiple nodes resulting in the same node to be discovered and output to reflect the relationship. In one implementation, the output from the optimized directed graph traversal may provide a human readable text describing the process flow. For example, conditions in the process represented by branches in the optimized directed graph may be shown with "if" and "else" statements or other conditional wording. The method may be implemented, for example, by the apparatus 100 of FIG. 1.

Beginning at 200, a processor determines a first node connected to at least two predecessor nodes in an optimized directed graph of a process flow. The processor may be any suitable processor, such as the processor 101. A node in the optimized directed graph with multiple predecessor nodes may be a node where more than one node points to it. The processor may determine the first node by performing a depth first traversal of the optimized directed graph and checking each node as it is traversed to determine if more than one node results in the particular node. In one implementation, the processor analyzes each node to identify those with multiple predecessor nodes and then performs the traversal of the optimized directed graph.

Figure 3A:
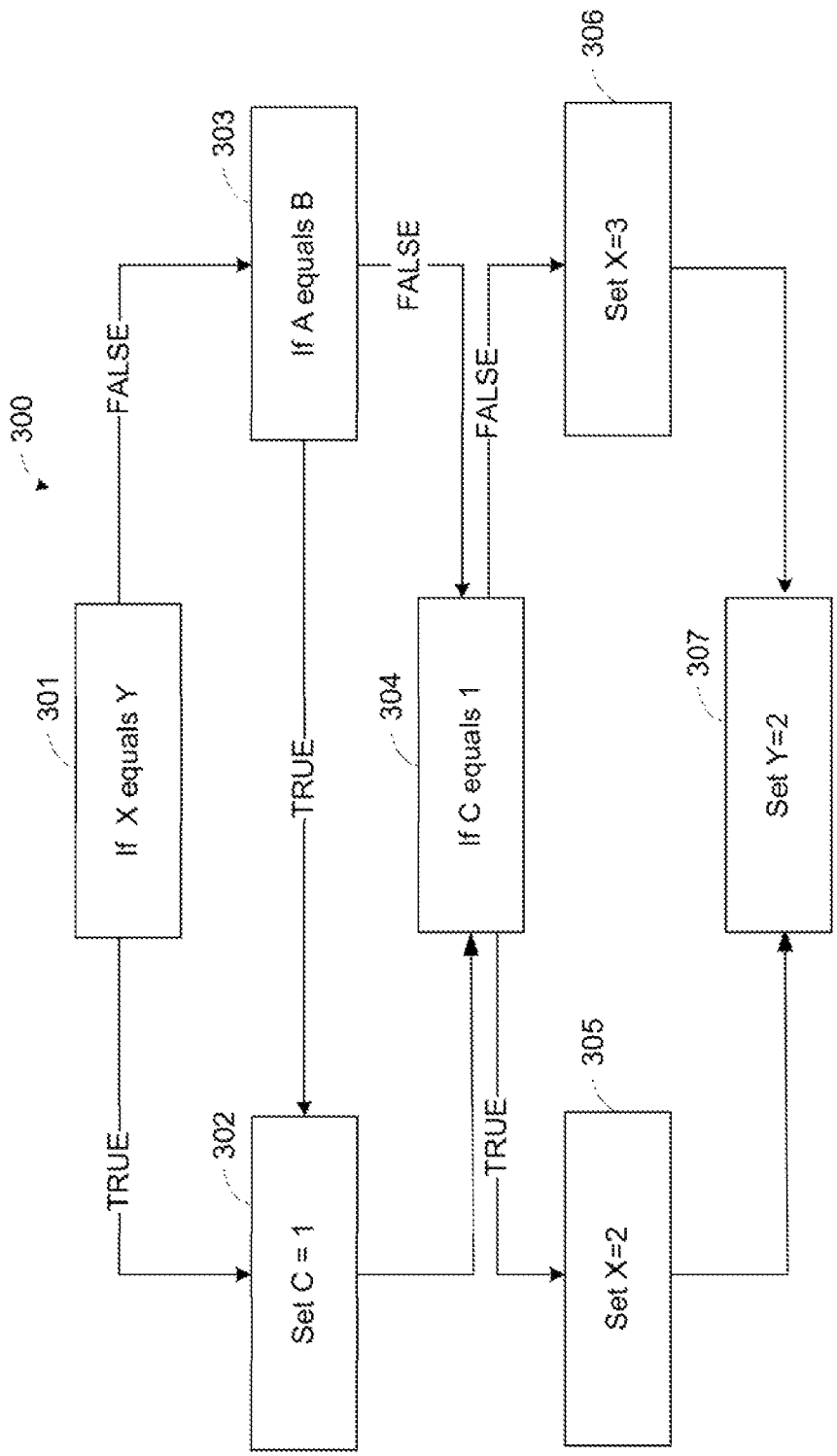
FIG. 3A is a diagram illustrating one example of an optimized directed graph.

FIG. 3A is a diagram illustrating one example of an optimized directed graph 300 with nodes 301-307. The optimized directed graph shows nodes of process steps with branches representing conditions in the process. For example, node 301 represents a check of a condition as to whether variable X equals variable Y. If so, the process proceeds to node 302 to set a variable C to equal 1. If variable X does not equal variable Y, the process proceeds to node 303 where a condition is checked to determine if variable A equals variable B. Node 303 proceeds to node 302 where variable A equals variable B. The optimized directed graph 300 reuses node 302 such that the statement to set C equal to 1 is not repeated in two separate nodes.

A depth first traversal of the optimized directed graph 300 may be performed such that each node extending from a first node is not traversed until each node feeding into the first node is traversed. A depth first traversal of the optimized directed graph 300 may begin with the root node 301. The processor may traverse nodes 301 and 302. When traversing node 302, the processor may determine that node 302 includes a second predecessor node, node 303. Nodes 304 and 307 also include more than one predecessor node. In some cases, a node may include more than two predecessor nodes.

Referring back to FIG. 2 and continuing to 201, the processor performs a depth first traversal of the nodes in the optimized directed graph above the determined predecessor nodes. The processor may perform the depth first traversal and then start a second traversal when a node is being traversed that has a second predecessor node. In one implementation, the processor identifies the nodes with multiple predecessor nodes and then begins a traversal of the optimized directed graph. The depth first traversal may proceed with the flow of the optimized directed graph traversing one conditional branch of a node until a node is reached that has multiple predecessor nodes.

Moving to 202, the processor performs a depth first traversal from the first node after the depth first traversal of the nodes above the determined predecessor nodes. A depth first traversal may be performed, and when a node with multiple predecessors is traversed, the predecessor nodes may be traversed prior to traversing the node. Performing a traversal of the each of the pathways to a first node prior to traversing the nodes of steps performed after the first node may preserve the context first node within the process flow.

As an example, in the directed graph 300 of FIG. 3 a depth first traversal to nodes 301 and 300 may be performed before a traversal of node 302, a depth first traversal to nodes 302 and 303 may be performed before node 304, and a depth first traversal to nodes 305 and 306 may be performed before the traversal of node 307. The traversal may be performed, for example, in the order of nodes 301, 302, 303, 302, 304, 305, 306, and 307.

In one implementation, a depth first traversal is performed of optimized directed graph nodes representing a loop of conditions. A loop in an optimized directed graph may be represented by a sub-graph where the condition is repeated until it is false. For example, node A may check whether variable X equals 10, node A may proceed to node B if false where variable X is increased by 1, node B may proceed to node A, and node A may proceed to node C where X equals 10 is true. A loop in an optimized directed graph may be traversed as a separate sub-graph such that the sub-graph may be traversed prior to traversing a node step to be performed after the condition of the loop satisfies a false condition. For example, nodes A and B may be traversed before traversing node C. A loop in an optimized directed graph representing a control flow of software source code may be, for example, a software source code loop indicating that a particular action be taken until a condition is false.

Proceeding to 203, the processor outputs text associated with a linear form of the process flow based on the depth first traversals. The text may be output, for example, by displaying, transmitting, or storing it. In one implementation, the text is output to another software application for analysis. The nodes may have one or more steps in a process associated with them, and the text may be output in a manner that reflects the relationship between the steps represented by the optimized directed graph. The output text may represent a linear form of the process flow such that it may be represented by a directed graph without optimizations for repetitious nodes. In one implementation, conditional statements, such as "if", "else if", or "else" statements, associated with the paths between the nodes are output in addition to text associated with the nodes.

Figure 3B:
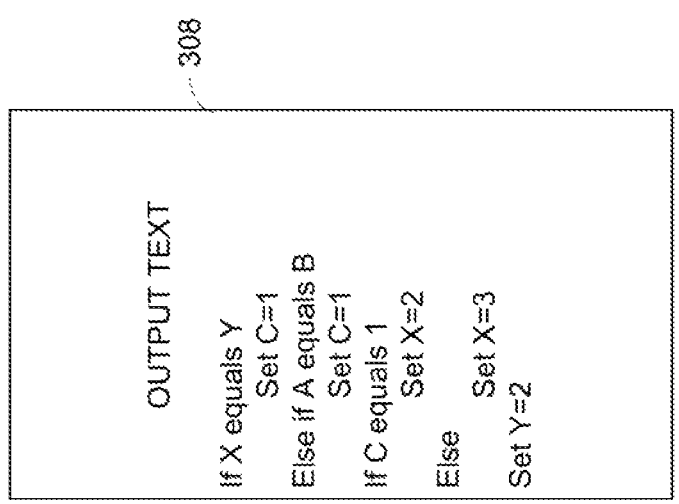
FIG. 3B is a diagram illustrating one example of output text from a traversal of an optimized directed graph.

FIG. 3B is a diagram illustrating one example of output text 308 from a traversal of optimized directed graph 300. The output reflects the relationships between steps in the optimized directed graph 300. For example, the if and else statements and their associated actions in the first four lines represent a linear version of the process flow between nodes 301, 302, 303, and 304 where C is set equal to 1 where X equals Y and where A equals B. In one implementation, the text may be combined where the text is repeated. Two conditional statements may be combined where the nodes associated with the two conditional statements result in the same node in the directed graph. For example, in output text 308, the following lines 1-4 to set C equal to 1 if X equals Y and set C equal to 1 if A equals B may be combined to be "If X equals Y or A equals B" then set C equal to 1.

Figure 4:
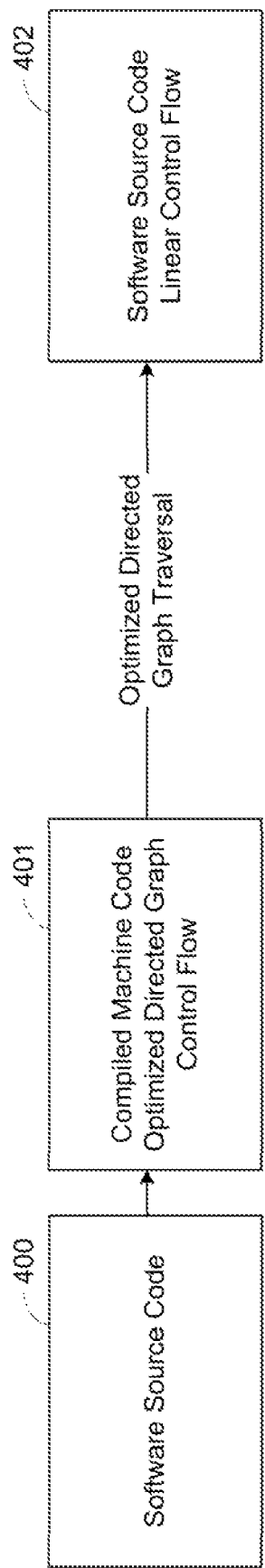
FIG. 4 is a flow chart illustrating one example of reverse engineering an optimized directed graph representing a software source code process control flow.

FIG. 4 is a flow chart illustrating one example of reverse engineering an optimized directed graph representing a software source code process control flow. For example, an optimized directed graph may represent a lower level machine code related to the software process, and it may be reverse engineered to a higher level software source code language. The reverse engineering may be performed in a manner that discovers relationships between steps despite the combination of steps in the lower level machine or object code.

Software source code 400 may be created by a software developer or automatically, such as by a process for creating software source code based on user interaction with a user interface. A software developer may write software source code, and the software source code may be written in a human readable linear form using a software language. The software source code may be in a linear form where the process control flow is written as conditional statements in text, such as "if" and "else" statements. For example, the software source code may describe the flow of a process where a first action is taken if a condition is true and a second action is taken if the condition is false.

A compiled machine code optimized directed graph control flow 401 of the software code may be created. The optimized directed graph may be, for example, the optimized directed graph 300 in FIG. 3A. Compilers may simplify software source code written in a human readable version to a lower level machine or object code that may be executed for use. The compiler may reduce the software source code control flow process to eliminate repetition. For example, the process flow of the software source code may be represented by a directed graph, and the compiled machine code may be represented by an optimized directed graph. The low level machine code may optimize the code such that some repetitious statements are removed, resulting in an optimized directed graph.

The nodes in the optimized directed graph may represent steps in software source code, and the branches between the nodes may represent different paths based on conditional statements in the software source code. For example, a node may include a conditional statement that may branch to a first statement node on a true condition and to a second statement node on a false condition. The optimized directed graph may have a node with two predecessor nodes. For example, if two statements in the code result in the same statement, that same statement may be presented once in the optimized version, causing two nodes to point to the same node.

The optimized directed graph created by the compiler may be traversed to create a software source code linear control flow 402. The software source code linear control flow 402 may be, for example, the output text 308 of FIG. 3B. The optimized directed graph traversal may be performed in a manner that discovers relationships between nodes where nodes were eliminated in the compilation process. For example, a depth first traversal of the optimized directed graph may be performed where each node extending from a first node is not traversed until each node feeding into the first node is traversed. The depth first traversal may be performed to reverse engineer the machine code to return it to a higher level of source code. An optimized directed graph traversal may be performed to reverse engineer the optimized directed graph to output a linear text version of the process flow. The reverse engineer software source code may then be used with methods designed for use for higher level software source code.

In one implementation, the software source code linear control flow 402 may then be re-optimized, such as by a different type of compiler. The reverse engineered process text may be provided to a different type of software program. The reverse engineering may allow a software application to use software source code compiled by an unknown compiler type. In one implementation, a software application receives compiled software code in an optimized directed graph format, and the software application reverse engineers the compiled software code and then recompiles in a different manner suited to the particular software application.

In one implementation, the reverse engineered software source code may be used for detecting a security vulnerability within the software code, such as within the software source code linear control flow 402. A processor, such as the same processor that reverse engineered the optimized directed graph or a different processor, may determine security information associated with the higher level software source code. For example, the output text may be analyzed or a recompiled version of the output text may be analyzed. The determined security information may be output to a storage, display, or another electronic device.

The invention claimed is:

1. A method, comprising:
analyzing, by a processor, an optimized directed graph of nodes representing a process flow, wherein the optimized directed graph comprises a first sub-graph and a second sub-graph, the first sub-graph being rooted at a first node and ending at a second node and comprising at least two predecessor nodes pointing at the second node, and the second sub-graph being rooted at the second node;
performing, by the processor, a depth first traversal of all nodes of the first sub-graph starting at the first node and ending at the second node;
after the depth first traversal of all nodes of the first sub-graph, performing, by the processor, a depth first traversal of all nodes of the second sub-graph starting from the second node; and
outputting, by the processor, text associated with a linear form of the process flow based on the depth first traversals, wherein the outputting comprises at least one of displaying the text and storing the text.

2. The method of claim 1, wherein the optimized directed graph comprises a control flow directed graph of compiled software code.

3. The method of claim 2, further comprising evaluating the output text for a security vulnerability.

4. The method of claim 2, further comprising traversing a software code loop as a separate optimized directed graph.

5. The method of claim 1, wherein outputting text comprises outputting conditional statements associated with the optimized directed graph based on the depth first traversals.

6. The method of claim 1, wherein outputting text comprises combining two conditional statements where the nodes associated with the two conditional statements result in the same node in the directed graph.

7. An apparatus, comprising:
a machine-readable non-transitory storage medium comprising instructions to:
analyze an optimized directed graph of nodes representing a process flow, wherein the optimized directed graph comprises a first sub-graph and a second sub-graph, the first sub-graph being rooted at a first node and ending at a second node and comprising at least two predecessor nodes pointing at the second node, and the second sub-graph being rooted at the second node;
perform a first depth first traversal of all nodes of the first sub-graph starting at the first node and ending at the second node;
after the first depth first traversal, perform a second depth first search of all nodes in the second sub-graph starting from the second node; and
output information related to the process flow based on the traversal, wherein the instructions to output information comprise instructions to at least one of display the information and store the information; and
a processor to execute the instructions stored in the machine-readable non-transitory storage medium.

8. The apparatus of claim 7, wherein instructions to output information comprise instructions to:
combine information from multiple nodes to create a conditional statement; and
output the conditional statement.

9. The apparatus of claim 7, wherein the optimized directed graph comprises an optimized directed graph of compiled software source code.

10. The apparatus of claim 9, wherein instructions to output information comprise instructions to output linear form of a software source code process flow.

11. The apparatus of claim 10, wherein the machine-readable storage medium further comprises instructions to:
determine security information associated with the linear form of the software source code process flow; and
output the determined security information.

12. A machine-readable non-transitory storage medium comprising instructions executable by a processor to perform operations comprising:
reverse engineering an optimized directed graph of nodes representing a software source code process flow, wherein
the optimized directed graph comprises a first sub-graph and a second sub-graph, the first sub-graph being rooted at a first node and ending at a second node and comprising at least two predecessor nodes pointing at the second node, and the second sub-graph being rooted at the second node, and
the reverse engineering comprises performing a first depth first traversal of all nodes of the first sub-graph starting at the first node and ending at the second node and, after the first depth first traversal, performing a second depth first search of all nodes in the second sub-graph starting from the second node; and
outputting text associated with the optimized directed graph nodes based on the reverse engineering, wherein the text represents a linear form of the process flow, wherein the outputting comprises east one of displaying the text and storing the text.

13. The machine-readable non-transitory storage medium of claim 12, further comprising instructions to analyze the output text for a security vulnerability.

14. The machine-readable non-transitory storage medium of claim 12, further comprising instructions to combine text from two nodes into a single conditional statement where the two nodes result in the same node.

15. The machine-readable non-transitory storage medium of claim 12, further comprising instructions to compile the linear form of the process flow.

* * * * *

UNITED STATES PATENT AND TRADEMARK OFFICE
CERTIFICATE OF CORRECTION

| | | |
|---|---|---|
| PATENT NO. | : 8,806,464 B2 | Page 1 of 1 |
| APPLICATION NO. | : 13/456385 | |
| DATED | : August 12, 2014 | |
| INVENTOR(S) | : David Bryan Dewey | |

It is certified that error appears in the above-identified patent and that said Letters Patent is hereby corrected as shown below:

On the title page:

Col. 2, line 5, OTHER PUBLICATIONS, third citation, after 'T. Ball' insert -- , --, therefor.

In the drawings:

In Sheet 1 of 5, reference numeral 103, line 2, delete "TRAVESAL", and insert -- TRAVERSAL --, therefor.

In the claims:

In column 8, line 24, in Claim 12, delete "east" and insert -- at least --, therefor.

Signed and Sealed this
Sixteenth Day of February, 2016

Michelle K. Lee
*Director of the United States Patent and Trademark Office*